US012034536B2

(12) United States Patent
Davies et al.

(10) Patent No.: US 12,034,536 B2
(45) Date of Patent: Jul. 9, 2024

(54) METHOD OF COMMUNICATION BETWEEN NODES IN A NETWORK

(71) Applicants: Alexander Phillip Davies, Duncraig (AU); Kevin Stephen Davis, Duncraig (AU)

(72) Inventors: Alexander Phillip Davies, Duncraig (AU); Kevin Stephen Davis, Duncraig (AU)

( * ) Notice: Subject to any disclaimer, the term of this patent is extended or adjusted under 35 U.S.C. 154(b) by 374 days.

(21) Appl. No.: 17/294,665

(22) PCT Filed: Nov. 18, 2019

(86) PCT No.: PCT/AU2019/051270
§ 371 (c)(1),
(2) Date: May 17, 2021

(87) PCT Pub. No.: WO2020/097697
PCT Pub. Date: May 22, 2020

(65) Prior Publication Data
US 2022/0123864 A1    Apr. 21, 2022

(30) Foreign Application Priority Data

Nov. 16, 2018  (AU) ................................ 2018904390

(51) Int. Cl.
*H04L 1/00*     (2006.01)
*H04L 5/16*     (2006.01)
*H04L 45/00*    (2022.01)
*H04L 47/62*    (2022.01)
*H04L 49/25*    (2022.01)
*H04L 69/22*    (2022.01)

(52) U.S. Cl.
CPC .............. *H04L 1/0082* (2013.01); *H04L 5/16* (2013.01); *H04L 45/20* (2013.01); *H04L 47/6225* (2013.01); *H04L 49/252* (2013.01); *H04L 69/22* (2013.01)

(58) Field of Classification Search
CPC ......... H04L 1/0082; H04L 5/16; H04L 45/20; H04L 47/6225; H04L 49/252; H04L 69/22; H04L 49/253; G06F 11/1451
See application file for complete search history.

(56) References Cited

U.S. PATENT DOCUMENTS

| | | | |
|---|---|---|---|
| 10,541,934 B1 * | 1/2020 | Subramanian | ........ H04L 49/253 |
| 2004/0258056 A1 * | 12/2004 | Ishihara | .............. H04L 61/4511 |
| | | | 370/386 |
| 2018/0288145 A1 * | 10/2018 | Levy | ................... G06F 11/1451 |

* cited by examiner

*Primary Examiner* — Shelly A Chase
(74) *Attorney, Agent, or Firm* — Tope-McKay & Associates

(57) ABSTRACT

A method of communicating between nodes in a network where a node receives a sequence of symbols that will form a packet on a first communications channel and has a planned packet that it would send on a second communications channel. A destination is encoded into an arbitration portion of a header sequence of the packet, the header sequence comprising a sequence of symbols. The transmission on the second communications channel is as per the planned packet, for as long as the symbols of the planned packet match the symbols being received on the first channel. An arbitration decision is made when the symbols do not match, with the node either continuing to send the rest of the planned packet, or the rest of the packet being received on the first communications channel.

27 Claims, 1 Drawing Sheet

METHOD OF COMMUNICATION BETWEEN NODES IN A NETWORK

FIELD OF THE INVENTION

The present invention relates to a communication method across nodes in a network, where packets of data are transmitted across point-to-point links, concurrent peer-to-peer transfers are supported across multiple hops of these point-to-point links, and total end-to-end latency is typically less than one packet time.

BACKGROUND TO THE INVENTION

Communications buses can typically be categorised as multidrop, point-to-point, daisy-chain, or switched, each with their own pros and cons.

Multidrop generally features common electrical connections across all nodes on the bus. For multidrop, all packets are "broadcast" to all other nodes on the bus, but through arbitration may support priority levels (e.g. on CAN bus), but the broadcast nature means only one node may communicate at a time. Large spans of the network may increase error rates, and the common electrical connections makes the bus unsuitable for power electronics where nodes may operate at different ground levels. However, all packets are minimal latency due that all nodes are directly wired together.

Other solutions commonly involve a "bus Master" entirely coordinating transfers across the system (e.g. I2C, USB, IEEE 1394), limiting or preventing devices from communicating peer-to-peer, wasting available bandwidth. Some systems (USB 3) allow some degree of autonomy/asynchrony between "hubs" and their connected nodes, in part to save power (eg, not forwarding packets to untargeted nodes), in part to allow different connection speeds (USB 1 co-existing on USB 3, etc), but achieve this via buffering and forwarding at each node, adding latency to each transfer. Effectively, every hub forms sub networks at each of its ports, reading packets on each subnetwork, and then forwarding them when there's an available opportunity to do so on its "main" network port. Buffering and forwarding implies a minimum of a one packet latency between nodes, and each hub, functioning more as a router, having to have some means of handling errors/retransmits/buffer status/ buffer full status, automatic repeat request for dropped packets. For a real-time system with a long daisy chain of nodes, these routing layers may lead to unacceptable end-to-end latency.

Some systems (IEEE 1394) further allocate time slices for isochronous transfers, along with time in which asynchronous events can be handled. This approach reserves a period of time in which critical information can be interjected on the network, and if none is present the bus is left idle. This idle time means wasted bandwidth whenever there is nothing asynchronous/urgent to communicate.

For some multi-master, distributed, or peer-to-peer architectures, a solution offering tighter real-time guarantees would be preferred. One that allows (a) multi-hop transfers with less than one packet total latency, (b) requires no prior reservation, (c) allows simultaneous transfers where possible, making more efficient use of bandwidth, (d) allows any node to initiate a multi-hop transfer.

The present invention relates to a method in which each node on the bus shifts a "planned packet" out on one communications channel as an "incoming packet" is concurrently received on an incoming communications channel.

The "planned packet" refers to the packet the node wishes to assert/inject on to its outgoing communications channel and would be the packet that would be sent absent interference on the incoming communications channel. A symbol by symbol comparison is performed between the "planned packet" and the "incoming packet", and for as long as the symbols are equal, they are output on the outgoing channel to form the "outgoing packet". Where a symbol differs, arbitration latches for either the remainder of the "planned packet", or the "incoming packet" to be output on the outgoing communications channel, to form the remainder of the "outgoing packet". As the headers compared equal up to the point of arbitration, the complete "outgoing packet" ends up identical to either the "planned packet" or the "incoming packet".

As symbols are processed as they are received, a packet header is used to serve as both routing information (eg destination node), and arbitration. The routing scheme is designed such that a node that has already reached its destination, or where its destination is not accessible on the "out" channel being communicated on, fails arbitration to the planned packet it is being compared against.

With exceptions, packets tend to expire when they reach the node they are targeted, allowing multiple concurrent transfers between subsets of the network. For daisy-chained nodes, destinations may be encoded as "distance from root", including priority or other identifying information and be sent most-significant-bit first, compared bit-for-bit, such that packets of otherwise equal priority are not forwarded past their intended destination, whilst still allowing a simultaneous transfer of data to occur in other parts of the network. With this technique, delays of one bit-time or less is typical per forwarding node, making the system well suited for complex synchronized systems such as multi-level or distributed inverters (see related patent "Power Conversion System" WO2013023248A1, Kevin Davies). Exceptions may include eg global priority level symbols prefacing any routing information.

For this invention, "symbol" refers to the minimum arbitration unit, and represents the delay at a given node. Where more complex arbitration or routing schemes are used, a "symbol" may comprise multiple bits, but always refers to the minimum unit that is assessed for arbitration and may differ from node to node. "Arbitration symbols" refers the multiple symbols that are used for arbitration of the packet, encoded in the packet header, and "arbitration period" refers the period over which they are transmitted.

SUMMARY OF THE INVENTION

According to one aspect of the present invention there is provided a method of communicating between nodes in a network where a node receives a sequence of symbols that will form a packet on a first communications channel and has a planned packet that to be sent on a second communications channel, the method comprising the steps of:
  encoding a destination into an arbitration portion of a header sequence of the packet, the header sequence comprising a sequence of symbols,
  wherein the transmission on the second channel is as per the planned packet, for as long as the symbols of the planned packet match the symbols being received on the first channel whereupon an arbitration decision is made when the symbols do not match, with the node either continuing to send the rest of the planned packet, or the rest of the packet being received on the first communications channel.

Preferably a node provides a clock for all other nodes, with this clock being recovered and reconstituted by each of its connected nodes via the timing of packets or symbols received.

Preferably the link between nodes is half-duplex, and a ping-pong arrangement is used, but with "up" and "down" phases synchronised across nodes for low-latency communication.

Preferably a symbol corresponds to one bit, and latency added at each node is less than two bit-times.

In a preferred embodiment, the nodes form a string.

Preferably nodes are addressed monotonically, and the address of the destination node of a packet is transmitted within the arbitration period most-significant bit first.

In a one embodiment, the arbitration portion includes symbols representing an explicit priority level to be transmitted before, between or trailing symbols representing the destination address.

Preferably a node, after sending a fixed number of planned packets with a given arbitration sequence does not generate planned packets within that same round robin sequence until an unlock sequence of symbols is received on the incoming channel.

Preferably packets that lose arbitration are stored for later forwarding

In one embodiment, nodes are discrete devices separated by wires.

In one embodiment, nodes are discrete devices separated by fibre optics.

In one embodiment, nodes are separate integrated circuits communicating via a PCB backplane.

In a preferred embodiment, error detecting codes are used to data corrupted in transmission In one embodiment, the error detecting code is a Cyclic Redundancy Check (CRC).

In one embodiment, during a predefined segment of time relative to each packet, data not subject to arbitration or forwarding is transmitted locally between nodes.

Preferably the nodes signify that they have detected an error in a forwarded packet by sending or corrupting trailing symbols of that packet.

Preferably a synchronized symbol clock is recovered by two nodes communicating across a point-to-point link In one embodiment, the recovered symbol clock pauses during periods of potential disruption of the communications channel.

Preferably the recovered symbol clock pauses during periods of potential disruption of the communications channel.

In one embodiment, a corrective signal is emitted on the communications channel at times when the symbol clock is paused.

Preferably packets inform nodes of periods of potential disruption via packets on the communications channel.

Preferably packets inform nodes of periods of potential disruption via packets on the communications channel.

In one embodiment, in the case where nodes have differing ground voltages, topographically near nodes communicating across a small potential difference in ground planes compared to distant nodes.

Preferably nodes monitor a packet error rate, noisy links are discovered, and communications is modified to minimise total bus errors.

In one embodiment, store-and-forward is adopted by the affected nodes.

In one embodiment, an alternate route becomes preferred.

In one embodiment, a full-duplex link drops to half-duplex across both channels to provide fault tolerance.

In one embodiment, a full-duplex link drops to half duplex across the more reliable channel to provide fault tolerance.

In one embodiment, low-priority packets destined for distant nodes are buffered at intermediate nodes and have their packet headers adjusted for intentional multi-hop transfers.

BRIEF DESCRIPTION OF THE DRAWINGS

The invention will now be described, by way of example, with reference to the following drawings, in which.

DETAILED DESCRIPTION OF PREFERRED EMBODIMENTS

Proposed is a system allowing simultaneous transfers on a string (daisy-chained) network, whilst allowing a packet, synchronized to a packet clock, to span the entire network (or subset thereof) with minimal latency. Typical is a one-symbol-per-hop delay, contrasting well with one-packet-per-hop delays as may be seen on USB (as packets may contain thousands of symbols).

Specifically, multiple "distance" packets can coexist on the network at a time, provided they do not require common links, maximising bandwidth. Where these "collisions" do occur, an arbitration method ensures implicitly that only one succeeds.

Figure 1:
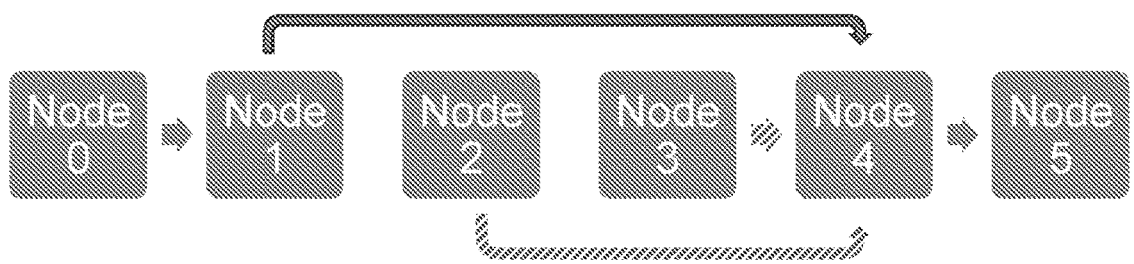
FIG. 1 is a string of 6 nodes performing three simultaneous transfers. A packet from Node1, to distant Node4, takes precedence over two packets by Node2 and Node3 that were destined for that same node preventing their transfer.

Referring to FIG. 1 a representation of a situation is shown where a series of nodes exists and where nodes 1, 2 and 3 all wish to send a packet to Node 4, with arbitration ensuring the "furthest" message succeeds. Non overlapping communications initiated by Node 0 and Node 4 also succeed concurrently, as they do have no overlap with any other transfer.

The method is as follows. One node, the Clock node (which can be any), "clocks" transfers throughout the network by sending a continuous stream of packets. Packets are composed of many symbols, typically each representing one bit of data. As these packets arrive at the nodes immediately connected to the Clock node, they are forwarded to the next connection or replaced with the nodes' own transmission, according to a symbol comparison. The total latency of the system can be under one-symbol per hop, requiring as a minimum only as long as it takes for a symbol to become decipherable by the receiver (eg, on the Serial Peripheral Interface, this is often half way through transmission of the symbol, before the transmitter begins transitioning to the next).

For simplicity, a 1 symbol delay per hop may be selected. If a packet is 128 bits long, and the network 32 nodes deep, end-to-end packet latency would be just ¼ of a packet period.

For this method, it is necessary to encode the destination in the header of the packet in a format that is also suitable for symbol-by-symbol arbitration. An explicit priority level and/or packet type may also be arbitrated against, but this additional level may have a side effect of reducing concurrent transfers of lower explicit priority packets, depending on the structure of the header.

Each node has (or may have) a packet that it wishes to "inject" on the bus, an "injection packet" (or "planned packet"). For as long as the incoming symbols match the injection packet, the node can simply clock those symbols out to the next node. On detecting a discrepancy, a decision is made for forwarding vs injecting, a decision that is "latched" until the next packet starts, at which point the process repeats.

Unique to this system is that the arbitration section implies the destination of the packet. When the packet reaches its destination, it then fails arbitration, allowing multiple simultaneous transfers on the network.

One such arbitration and encoding scheme:
One bit per symbol
Single symbol arbitration (giving 1 symbol latency per hop)
"1" bit wins arbitration
3-bit destination at the start of packet, encoded in natural binary, most-significant-bit (MSB) first, as "distance from root", leading to monotonically increasing addresses Generally, in the case of ties (e.g. where multiple nodes attempt to communicate with the same destination), decision ought to favour the more distant communication, as in FIG. 1 Nodes 1, 2 and 3 all wish to send a packet to Node 4, with arbitration ensuring the "furthest" message succeeds. This is for a few reasons:

1. It is in the interest of the network designers to minimise the number of hops for common transfers, maximising bandwidth by placing dependent nodes topographically near one another. Hence, an incoming packet addressed "over" of the internal node likely contains critical asynchronous information.
2. The incoming packet has likely already interrupted communications between other nodes, so it should be preferred to succeed to prevent retries.
3. A node can know that it has forwarded a packet, but it discovering that it has failed arbitration later in the chain requires further communication. Thus, it is preferable that any packet successfully transmitted on one outgoing link, is assumed to have sufficient priority to reach its destination, at least in the event of ties.

In this system as described, destination doubles as "priority" level. It is possible to either include an explicit "priority" bit as well, or to increase the destination (or use a reserved destination, e.g. 0b111), provided all nodes know how to interpret the packet. Note that in the use of an explicit priority bit, all sub-communications will be interrupted even past the intended destination, provided no other packets are being sent with the priority bit set.

Multicast packets are similar, destination is simply the "furthest" node, with each node reading and interpreting the packet on the way.

Sometimes, it may be of interest to have multiple chained nodes have the same routing information or "address". For nodes with the same address, a second priority field after the destination in the header can serve additional arbitration, and ties may be selected to favour the local node. For instance, with multiple nodes sharing address "0b010", a low priority/status packet may concatenate a "0" for "0b0100" (transmitted MSB first). These transfers can occur concurrently between the common nodes, until a node (either from within the chain, or preceding it) sends a "0b0101", in which case all nodes sharing that address will receive the higher priority packet.

In the preferred embodiment, each node recovers the clock via a phase-locked loop synchronized to the start bit of each packet, transmitted as a known edge in each packet. This clock, once recovered, is then used to reconstitute clean outgoing edges according to each node's local (synchronized) time.

In an alternate embodiment, the time of the edge is captured and compared to a reference clock, and the distance between packets is used to set-up the expected time of the next packet, with no PLL being required.

Packet Modification

Each node may modify the packet as it forwards it. This could be a "destination" encoded instead as a sequence of "1"s, for instance, deleting one at each hop. A node could also encode the route taken in the packet as it sends it, in the case of more complex networks. Or a node may encode in the packet if it has detected an error, notifying further receivers that at least one node has rejected the packet.

As packets will usually contain error detecting codes, any "modifiable" section must either be excluded, or an offset/correction applied to that code as it is forwarded. This is possible in the case of cyclic redundancy checks (CRC), as the effect of changing a symbol can be computed and applied as each bit arrives (via the XOR operator), with no additional delay.

Reconstitution

Symbols are decoded at each node before they are compared with the injection packet and/or forwarded to the next node. This decoding may include a validity check (e.g. analog level, or timing, or transition timing e.g. with Manchester encoding), and/or error correction (glitch removal or forward error correction).

Validation typically takes a bit under one symbol time, as after half-way through the symbol, the transmitter has already begun transitioning to the next symbol. One symbol per hop is selected to ease implementation, but less (such as 0.5 symbols/hop) could be used also. The delay could also be varied per node, for instance nodes with multiple outwards channels may delay for an additional symbol, allowing which of their forward-channels is being selected.

Error Handling

To reduce errors from propagating across the network, symbols that fail validity checking may prevent "forward" mode from becoming latched. For example, if Manchester encoding is used, the clock can be validated before the symbol is accepted/considered for forwarding. Similarly, voltage levels can be checked for conformance for NRZ codes, etc. Symbols may also employ Forward Error Correction (such as being 7,4 Hamming Codes) allowing for single-bit errors to not corrupt routing/arbitration.

A symbol may resolve to more than one bit of information and be used to allow low-latency routing and arbitration across tree like structures. The corollary is a "string", or daisy-link topology, where each node connects to at most two other nodes, and there are two "end" or terminating nodes. A "ring" structure is string-like, except the two ends are joined, such that every node is an interior node.

Error Isolation

Preferably, each node monitors the rate at which errors are received and decides whether to continue forwarding from the given channel, or whether to isolate and/or buffer incoming packets for retransmission only when each passes verification. By communicating error information between nodes, the exact location of noisy links can be discovered, and the low-latency forwarding layer disabled across this link in favour of whole-packet buffering.

This allows a 30 processor system with an unreliable channel between processor 21 and 22, to have 1 symbol latency per hop between the first 21 nodes, then a 1 packet latency (+ retransmits, when errors occur), before 1 symbol latency for the remaining nodes. For a packet 100 symbols long, this system would have end to end latency of (28 symbols+100 symbols*(1+ retransmit rate)), superior than using pessimistic "buffer and forwarding" at every node, and potentially with higher reliability than if all processors communicated on a parallel bus (where an error anywhere along the line would affect all nodes equally). Benefits are had in the noisy link not affecting the routing or arbitration of more local packets, allowing local transfers to continue to occur.

Half Duplex Operation

Nodes with half duplex connections may use ping-pong arrangement for communication. By synchronizing which packets are "up" direction and which are "down", across the global bus (e.g. every even packet transfer==towards the end of the chain, odd packet transfer==towards the start), some nodes may perform full duplex transfers whilst others "ping-pong". Packets that are to be sent "over" these ping-pong nodes are sent on the corresponding cycle, ensuring they are not needlessly held up. It is important to synchronize the transfer per global packet counter, to ensure they are not held up at every half-duplex node along the way. In this case, the Clock node may still be a singular node, and the "last" node of the system may simply clock a packet towards the Clock node in response to each packet received.

Packet types may also be specialised per direction according to bandwidth requirements in each direction (e.g. 128 bits "up", 64 bits "down").

Full↔Half Recovery

For nodes with Full Duplex links, the noisy link may be replaced with a Half Duplex link on the reliable communications channel, alternating between transmitting (Tx) and receiving (Rx) on alternate packet cycles (provided the link is capable of this). By synchronizing Half Duplex operation globally as to whether even cycles are "Tx" or "Rx", low latency can continue to be achieved, only with reduced throughput compared to Full Duplex. When dropping down from "full duplex" to half duplex, each packet could be sent across both connections, with either packet being accepted when the CRC detects no error.

Alternate Paths

A general weakness of "daisy-chained" systems is the potential for a faulty node to bring down the whole system. This can be mitigated by providing alternate paths, e.g. by connecting the end of a string back to the start, allowing packets to be routed around faulty nodes (by sending "the other way" around the ring to bypass the faulty node). Another method taken can be a "fail-safe" bypass circuit, which by default bypasses a node connecting its two communication channels directly together until the node is able to wake-up, integrity-check its operations, and then disable this circuit.

Alternate paths may also be provided in cabling between nodes. Eg, rather than "breaking" the conductor at each node, two paths could be provided. One "broken" by the node, the other providing a direct connection to the next node. This way if a node fails to wake, the previous node can communicate to the next node via the alternate path, allowing the faulty node to by bypassed.

Figure 2:
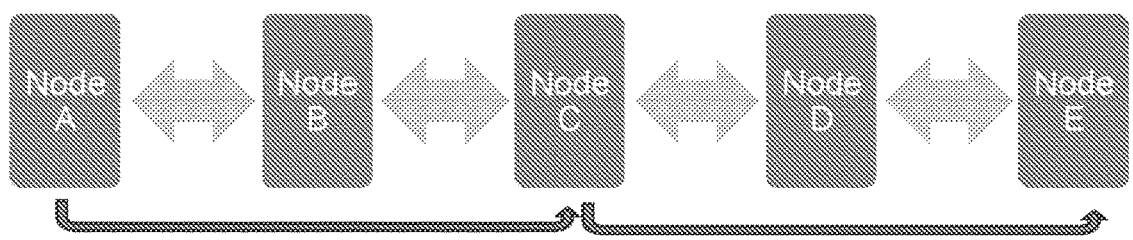
FIG. 2 shows a method of providing alternate routes through an otherwise daisy-chained system, to allow for recovery if one of the daisy-chain links fails.

Referring to FIG. 2, there is shown a daisy-chained bus with full duplex links between nodes, and an alternate half duplex path provided between Even nodes. If the primary link fails, the alternate can be used in ping-pong fashion for redundancy Error Notification If a node detects it has forwarded an invalid packet (eg a parity or CRC mismatch), it may intentionally corrupt trailing symbols of the packet notifying the final recipient that at least one node failed to decode the packet. If these symbols were "clear" (uncorrupted) on receipt, it indicates the corruption likely occurred between this node and the previous node, which may affect future routing and arbitration decisions.

The node may, for instance, opt a policy of not forwarding any packets from this channel until the whole packet has been decoded successfully, adding a one packet latency between just that node and its neighbour. Another may be to raise the arbitration requirements, such that "critical" packets still get through (despite high error rate), but others where the increased latency is an acceptable trade-off for higher bandwidth, do not. In this way, comparisons are still made symbol-for-symbol, but the window in which arbitration and the forward/inject decision is made is smaller, _or_ the incoming packet is compared with an elevated version of its injection packet.

Non Arbitrated Segment

Packets may include sections not subject to arbitration, allowing for direct peer to peer transfers even when the priority bus is active. These may in turn be propagated one hop per packet period, allowing for a second channel to exist on the bus, albeit with higher latency. As the rest of the packet may be substituted, this segment would generally be protected by its own error detecting code/CRC, although it could also be mixed into the CRC as described in "Packet Modification".

This segment may also be routed in a predetermined manner, rather than only to the nearest neighbour, e.g. where Node 3 needs a second communications channel to Node 5, with Node 4 facilitating that.

The Non-Arbitrated segment is well-suited for providing processing time, e.g. for placements either between packets (allowing the "main" packet to be processed), or before the error detecting code (where a processor is being used to verify the CRC in software).

Prepend/Append Segments

Each node may append/prepend symbols as they forward packets, signifying where the packet has come from (resolving loops), and/or supplying a low-data-rate stream of information, per node.

Time-Shifted Packets

Rather than symbol encoded, packet priority/destination can also be encoded temporally. In the system as described, one node sends first, the next one-symbol-time later, so on and so forth with that the packet propagating from the root out.

With time-shifted packets, the distance a node wants a packet to travel on a transfer cycle is encoded in the time at which the packet is sent. If sent at T0, it'll go just one hop, as the receiver won't have time to forward it any further until the next packet cycle begins. If it sends the packet at T-3, it'll travel three hops until it reaches its target. Whether to forward or not simply becomes a test of whether the packet comes in before a node injection packet is configured to go out. To send the packet as higher priority, send it earlier, although it'll also reach a further target in doing so.

This is much the same system, where "symbol" includes an "idle" state and equates to just a slight difference in outgoing packet timing.

Acks/Naks

If a node is expecting a response from another node, and it sees a packet that should have failed arbitration against the response packet, it knows that there's been packet loss along the way (either there or back) and it can attempt retransmission. If a node arbitrates its inject packet above the incoming packet, it may choose to notify the sender that it should retry, or it may buffer the packet and resend depending on what method of ARQ is preferred.

According to an alternative embodiment where multiple nodes want to take turns sending data to a distant node, preference is given to the local node in the event of ties and a priority level may precede the "Destination" field in the arbitration section. With this set-up, each node attempts to communicate their information to the distant node, but the higher priority is sent first and lower priority is either stored if it was incoming or held if the incoming had priority. This allows high priority asynchronous packets to "overtake" while not reducing throughput.

Round-Robin Sharing

Where multiple nodes want to take turns sending data to a distant node, preference is given to the local node in the event of ties and a "Packet Type" (implying priority level) may follow the "Destination" field in the arbitration section. With this set-up, each node attempts to communicate their information to the distant node, but only the first will succeed. At that point, the first should not attempt to resend until a packet representing the idle state has been reached from the end of the chain. Each node follows similar rules, allowing (a) high priority asynchronous packets to still "overtake" this shared bus, (b) round-robin communication.

Alternatively, and preferably, preference is given to the remote node in the event of ties, and "token passing" is used instead. In this method, one node is receiving data from multiple nodes in a daisy-chained string. The recipient node sends a "token" to the last node in the chain, requesting data from it. That node communicates the non-priority data, and the rest wait their turn. When a node sees that it has forwarded a packet from a node immediately after it (where each packet includes a "source" section), it assumes ownership of the token and communicates its data. The cycle repeats when the last node has communicated its data, or when the receiving node has realised a token-passing error (either via timeout, or realising that lower priority/"idle" packets are being received over the data it has requested).

Starvation

Where round robin sharing is not used, a node that is seemingly starved, unable to get a packet through, may elevate its packets priority after a timeout. As a consequence of the bus as described, this packet may be received by more nodes than originally intended, but the packet scheme can be designed to mitigate problems from this (eg via redundantly encoding the address within the packet payload).

Error Reduction

Where a bus expects noise to occur at a given time in reference to the global clock, e.g. as may happen in a system where each node is controlling electrical switches in a multi-level inverter, the communicating nodes may "skip" clocks received from the global clock, preventing their TX/RXs from shifting data on to an error-prone channel. During the period in which the global clock is paused, nodes may put out alternative signals on the communication links to "reset" the channel electrically in case it had been affected by the event before shifting resumes. These periods may also be used to help correct DC Bias accumulated during the previous transfer. They may also be present at a regular interval, aiding in synchronizing of the global clock shared between nodes.

Further, in the case of an inverter system where these nodes may operate with different or changing ground voltages with respect to one another (representing levels in a multilevel or distributed inverter), the total voltage isolation may be able to be reduced by connecting "levels" together in a daisy-chain string. For instance, if each node operates +/−100V from the nodes it directly communicates with, a string of 15 nodes may differ by +/−1500V end-to-end, but isolation requirements are far less at only 100V per level, potentially increasing reliability, saving cost, and providing more design flexibility.

In these systems, events that disrupt the communications are common, but these can be either scheduled with respect to a common packet/symbol clock, or communicated ahead of time via the low-latency communications. Each node can pause communications over these potential disturbances, until the external event has settled. That is, if nodes communicate at similar reference voltages, communications can be paused during short-term voltage transitions in these reference voltages.

In this implementation, all nodes would by synchronised, and as each node shifts symbols simultaneously, an effective "blanking" period on the global clock pauses the shifting, effectively insulating each node from the potentially communications disruptive electrical event.

Figure 3:
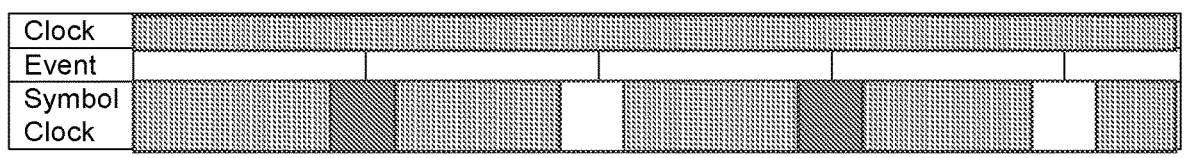
FIG. 3 shows a clock source driving symbol transitions, being masked for planned events that may have caused errors on the communications line, such that during these periods symbols are "held up" rather than potentially corrupting the transmission.

Refer to FIG. 3, that shows the symbol clock used for communication between two nodes over their direct connection, as might be used for a Serial Peripheral Interface (SPI). Potential disruptive events caused by the system occur only at given points with respect to a globally synchronized clock, and during these times the nodes "blank" their clock source such that symbols are "held up" across these points in time where data may not be able to be reliably transmitted. This method allows packets to span multiple potential events without relying on forward error correction or retransmission.

In FIG. 3, note how the high frequency "Clock" toggles once per Symbol, except during events (shown alternating high and low, as if there is an odd number of Symbol clocks per Event). To reduce the overhead of these "blanking" periods, they may be communicated ahead of time (ie planned events) rather than pessimistically applied at every possible point of interruption.

For another preferred embodiment the system communicates via NRZ blocking capacitors. During blanking periods the node drive their output communications channels to a known voltage, ensuring the NRZ blocking capacitors are in known state, ready for subsequent symbol transmissions.

Process

System config: symbols convey 1 bit of data, 1 symbol delay per hop, packets 8 symbols long, priority given to "1" symbols. Arbitration window=first 3 symbols (sufficient to address "8" nodes), after which the "incoming" channel is preferenced (to give priority to long-distance packets).

Initial config, showing the data each node wishes to transfer. For this demo:

Node (0) wishes to send a packet to Node (3), addressed from root outwards. Other nodes wish to send only to the next Node. "T" refers to real-time, and each node has to account for the single symbol latency from the node before it (hence the packet skew), d="data", x="don't care" (previous/next packet).

|  | T0 | T1 | T2 | T3 | T4 | T5 | T6 | T7 | T8 | T9 |
|---|---|---|---|---|---|---|---|---|---|---|
| Node 0 (0b000) | 0 | 1 | 1 | d | d | d | d | d |  | X |
| Node 1 (0b001) | 1 |  | 0 | 1 | 0 | d | d | d | d | d |
| Node 2 (0b010) | x |  | 0 | 1 | 1 | d | d | d | d |  |
| Node 3 (0b011) | x | x |  | 1 | 0 | 0 | d | d | d |  |
| Node 4 (0b100) | X | x | x |  | 1 | 0 | 1 | d | d | d |

Reorganised according to each node's common clock (C), with arbitration loses shaded:

|  | C0 | C1 | C2 | C3 | C4 | C5 | C6 | C7 | Notes |
|---|---|---|---|---|---|---|---|---|---|
| Node 0 (0b000) | 0 | 1 | 1 | d | d | d | d | d | Node 0 Reaches 3 |
| Node 1 (0b001) | 0 | 1 | 0 | d | d | d | d | d | Fails first arbitration |
| Node 2 (0b010) | 0 | 1 | 1 | d | d | d | d | d | Fails first arbitration |
| Node 3 (0b011) | 1 | 0 | 0 | d | d | d | d | d | Node 3 Reaches 4 |
| Node 4 (0b100) | 1 | 0 | 1 | d | d | d | d | d | Node 4 Reaches 5 |

Nodes 0, 3 and 4 successfully complete transfers, not failing arbitration until they've reached their destinations.

Multicast

Packets can be interpreted by multiple nodes along the path of each transmission, allowing for multicast packets. Multicast packets present a problem in that even if a node furthest away responds with an "Ack" packet, it cannot be assumed that all nodes along the way have also correctly decoded the data (full FIFO/CPU busy/two errors that cancel out in transmission on either side of a node, etc). Additional difficulty arises when the possibility of one node rejecting a packet, whilst the next node accepts it (eg, fails signal integrity or CRC at one node, but is accepted at the next). Additional constraints can be used to mitigate this risk:

1. Error Notification, where any node forwarding a packet that it believes to be in error gets intentionally corrupted by the transmitting node, for example via corrupting trailing "Key" bits. Via this method, the end node knows not to respond with an Ack if a corrupt Key is received, as there's been errors along the way. This does not guarantee that _no_ node actioned the packet, as some prior the corruption may have already processed it. Sequence bits may be used to identify retransmits, as is common in ARQ.
2. Forward Blocking. If each packet is generally followed by a response packet in the opposite direction, a node may decide to not route any potential response packet after receiving an outgoing error, preventing a potential Ack from getting through. The node may alternatively notify all nodes in the direction of sender that there's been an error. By this method, an "Ack" from the last node cannot be received by the sender unless each node along the way permitted it, meaning they accepted the packet also.

EXAMPLE PACKET STRUCTURES

Packet Format 1 (MSB First)
  Priority: 1 bit; when set, goes further and over any regular packet (e.g. faults/critical events)
  Destination: 4 bit; distance from root
  Packet Type: 4 bit; implicit priority level per packet type
  <arbitration ends>
  Distance: 4 bit; source's distance from destination
  Payload; 64 bits
  CRC; 16 bits (selected for 6 bit HD across the 77 bit packet)

With this format and arbitrating such that '1's "Latch" a packet for forwarding on first discrepancy, packets of equal Priority can co-exist on the bus, with preference being given to packets that have the furthest destinations. Where destinations are equal, they're arbitrated second on Packet Type. Where destination and packet type are equal, the packet that has already travelled the furthest wins arbitration.

At this point, by this spec, it would be a receive or generation error for both packets to still be equal (as it implies they both originated at the current node) and the node's own TX can take priority. Additionally, the source of the packet is known by all that receive it (Destination minus Distance).

Packet Format 2 (MSB First)
  Priority: 1 bit; when set, goes further and over any regular packet (e.g. faults/critical events)
  Destination: 4 bit; distance from root
  Packet Type: 4 bit; implicit priority level per packet type
  <arbitration ends>
  Payload; 64 bits
  CRC; 16 bits (selected for 6 bit HD across the 73 bit packet)

Same as Packet Format 1, but at the end of arbitration the node algorithmically gives priority to either itself, or the incoming packet. Generally, priority to the incoming packet is the preferred scheme, as that data has potentially already made a hop, but other aforementioned factors (round-robin/fairness techniques, error rate) may be considered.

Packet Format 3 (MSB First)
  SubNet: 2 bits; divides the chain in to predetermined "sub networks", preventing priority packets from being transmitted past their intended subnet
  Priority: 1 bit
  Destination: 4 bit; distance from root
  Packet Type: 4 bit; implicit priority level per packet type
  <arbitration ends>
  Payload; 64 bits
  CRC; 16 bits (selected for 6 bit HD across the 76 bit packet)

Similar to Packet Format 2, but with a coarser-grained version of Destination, referred to as SubNet (for sub network), preceding a Priority bit. In this manner, a priority packet can be localised to relevant SubNets. Eg, Node 5 of SubNet 0 can send a priority packet to SubNet 2, without interrupting any communications in SubNet 3.

Via the same logic, Destination need not actually provide "per node" granularity, but could group sequential nodes together.

Packet Format 4 (MSB First)
  Priority: 1 bit; when set, goes further and over any regular packet (e.g. for faults/critical events)
  Destination: 4 bit; distance from root
  Packet Type: 4 bit; implicit priority level per packet type
  Distance: 4 bit; source's distance from destination
  <arbitration ends>
  Payload; 64 bits
  Local Transfer:
    Data: 8 bits
    Sender: 1 bit
    DataCRC: 7 bit CRC; 16 bits (selected for 6 bit HD across the 77 bit packet excluding Local Transfer)

Key; 4 bits (0b0110 if correct, 0b1001 if an error is detected)

In this packet format, a non-arbitrated non-routed Local Transfer is transmitted to the next node only. It is a self-contained "packet" of data, allowing communications even when the bus is busy with higher priority transfers. By placing Local Transfer before the CRC, it provides a receiving node time to prepare its expected CRC for the 77 bit "outer" packet and/or verify the basic structure of that packet (e.g. Payload looks valid with respect to the encoded Packet Type). Then, as the CRC is received, it can be checked against the expected CRC. If a discrepancy is detected, the node corrupts "Key", to notify further nodes that it did not receive the packet correctly.

If the CRC is detected invalid, the node corrupts *not* the remainder of the CRC, but a separate "Key" field by sending it as its bitwise complement, ensuring maximum Hamming Distance (=4). In this way the final recipient of the packet can (a) verify the packet itself and (b) recognise that another node rejected the packet. For any given Bit Error Rate, key can afford a lower Hamming Distance than the packet itself, due to the less opportunity for corruption. For many communications systems, "transitions" are important in the key, to detect the difference between an "idle line" and a valid or invalid key.

"Key" makes flow control/acknowledgements easier in the case of multi-recipient packets, as now the destination node is able to convey this information in any "ack" packet back to sender.

For dedicated hardware solutions (which may include FPGAs or ASICs) with hardware CRC, the "delay" filled with Local Transfer between the transmission of Data and its CRC would not be necessary, but there may still be utility gained from the Local Transfer as a second reliable communications path, and it also provides time for non-specialised microprocessors to prepare their response.

Local Transfer preferably includes a bit identifying the node that prepared it (e.g. its position modulo 2), to detect a hardware/software failure where a node is forwarding that part of the packet erroneously.

It will be readily apparent to persons skilled in the relevant arts that various modifications and improvements may be made to the foregoing embodiments, in addition to those already described, without departing from the basic inventive concepts of the present invention.

What is claimed is:

1. A method of communicating between nodes in a network where a node receives a sequence of symbols that will form a packet on a first communications channel and has a planned packet that to be sent on a second communications channel, the method comprising the steps of:
encoding a destination into an arbitration portion of a header sequence of the packet, the header sequence comprising a sequence of symbols,
wherein the transmission on the second channel is as per the planned packet, for as long as the symbols of the planned packet match the symbols being received on the first channel whereupon an arbitration decision is made when the symbols do not match, with the node either continuing to send the rest of the planned packet, or the rest of the packet being received on the first communications channel.

2. The method in accordance with claim 1, wherein where a node provides a clock for all other nodes, with this clock being recovered and reconstituted by each of its connected nodes via the timing of packets or symbols received.

3. The method in accordance with claim 1, wherein the link between nodes is half-duplex, and a ping-pong arrangement is used, but with "up" and "down" phases synchronised across nodes for low-latency communication.

4. The method in accordance with claim 1, wherein a symbol corresponds to one bit, and latency added at each node is less than two bit-times.

5. The method in accordance with claim 1, wherein nodes form a string.

6. The method in accordance with claim 5 wherein nodes are addressed monotonically, and the address of the destination node of a packet is transmitted within the arbitration period most-significant bit first.

7. The method in accordance with claim 1, wherein the arbitration portion includes symbols representing an explicit priority level to be transmitted before, between or trailing symbols representing the destination address.

8. The method in accordance with claim 7, wherein a node, after sending a fixed number of planned packets with a given arbitration sequence does not generate planned packets within that same round robin sequence until an unlock sequence of symbols is received on the incoming channel.

9. The method in accordance with claim 1, wherein packets that lose arbitration are stored for later forwarding.

10. The method in accordance with claim 1, wherein nodes are discrete devices separated by wires.

11. The method in accordance with claim 1, wherein nodes are discrete devices separated by fibre optics.

12. The method in accordance with claim 1, wherein nodes are separate integrated circuits communicating via a PCB backplane.

13. The method in accordance with claim 1, where error detecting codes are used to detect data corrupted in transmission.

14. The method in accordance with claim 13, wherein the error detecting code is a Cyclic Redundancy Check (CRC).

15. The method in accordance with claim 14, wherein during a predefined segment of time relative to each packet, data not subject to arbitration or forwarding is transmitted locally between nodes.

16. The method in accordance with claim 1, wherein the nodes signify that they have detected an error in a forwarded packet by sending or corrupting trailing symbols of that packet.

17. The method in accordance with claim 1, wherein a synchronized symbol clock is recovered by two nodes communicating across a point-to-point link.

18. The method in accordance with claim 17, wherein the recovered symbol clock pauses during periods of potential disruption of the communications channel.

19. The method in accordance with claim 18, wherein a corrective signal is emitted on the communications channel at times when the symbol clock is paused.

20. The method in accordance with claim 18, wherein the packets sent on the communication channel include information regarding periods of potential communication disruption.

21. The method in accordance with claim 1, wherein the nodes in the network are part of an inverter system and have differing ground voltages.

22. The method in accordance with claim 1, wherein nodes monitor a packet error rate in order to detect noisy links, and communications is modified on detection of noisy links to minimise total bus errors.

23. The method in accordance with claim 22, wherein store-and-forward is adopted by the affected nodes.

24. The method in accordance with claim 23 wherein a full-duplex link drops to half duplex across the more reliable channel to provide fault tolerance.

25. The method in accordance with claim 22, wherein an alternate route becomes preferred.

26. The method in accordance claim 22, wherein a full-duplex link drops to half-duplex across both channels to provide fault tolerance.

27. The method in accordance with claim 1, wherein packets having a low priority destined for distant nodes are buffered at intermediate nodes and have their packet headers adjusted for intentional multi-hop transfers.

* * * * *